United States Patent
Takeuchi et al.

(10) Patent No.: US 7,903,173 B2
(45) Date of Patent: Mar. 8, 2011

(54) MOVING IMAGE DISPLAY DEVICE AND METHOD FOR MOVING IMAGE DISPLAY

(75) Inventors: Kesatoshi Takeuchi, Shiojiri (JP); Takahiro Sagawa, Chino (JP); Hidehito Iisaka, Shiojiri (JP); Mitsuhiro Inazumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1169 days.

(21) Appl. No.: 11/585,825

(22) Filed: Oct. 25, 2006

(65) Prior Publication Data

US 2007/0097260 A1    May 3, 2007

(30) Foreign Application Priority Data

Oct. 28, 2005 (JP) .................... 2005-314217

(51) Int. Cl.
*H04N 7/01*   (2006.01)
*H04N 5/57*   (2006.01)

(52) U.S. Cl. ....................... 348/441; 348/687

(58) Field of Classification Search .............. 348/441, 348/443, 447, 456, 458, 459, 558, 598, 561, 348/562, 584, 588, 673, 687; H04N 7/01, H04N 11/20, 5/46, 9/74, 9/76, 5/14, 5/57
See application file for complete search history.

(56) References Cited

U.S. PATENT DOCUMENTS

| | | | |
|---|---|---|---|
| 4,710,809 A | 12/1987 | Ries et al. | |
| 5,060,064 A | 10/1991 | Lamnabhi et al. | |
| 5,214,751 A | 5/1993 | Robert | |
| 5,648,814 A * | 7/1997 | Munson | 348/687 |
| 5,872,602 A * | 2/1999 | Johnson | 348/687 |
| 6,137,947 A | 10/2000 | Ohta et al. | |
| 7,310,118 B2 | 12/2007 | Kamimura | |
| 2002/0084959 A1 | 7/2002 | Park et al. | |
| 2004/0046891 A1 | 3/2004 | Mishima et al. | |
| 2006/0192896 A1 | 8/2006 | Sawa | |

FOREIGN PATENT DOCUMENTS

| | | |
|---|---|---|
| CN | 1169360 C | 9/2004 |
| GB | 2 110 046 A | 6/1983 |
| JP | A 04-302289 | 10/1992 |
| JP | A-9-187014 | 7/1997 |
| JP | A 2001-042282 | 2/2001 |
| JP | A 2001-296841 | 10/2001 |
| JP | A 2002-169514 | 6/2002 |
| JP | A 2003-069961 | 3/2003 |
| JP | A 2005-003897 | 1/2005 |
| JP | A-2005-217847 | 8/2005 |
| JP | A-2005-241787 | 9/2005 |

* cited by examiner

*Primary Examiner* — Sherrie Hsia
(74) *Attorney, Agent, or Firm* — Oliff & Berridge, PLC (57) ABSTRACT

The synthesizing circuit inputs signals representing the brightness coefficient K2 and the brightness coefficient K3 from the multiplexer, and inputs the overscanned frame image data D1 in pixel units from the first latch circuit. When the start frame image read the third time and the after frame image read the first time are input simultaneously, the synthesizing circuit calculates the brightness coefficient K2 for the brightness value of the pixels of the start frame image, and calculates the brightness coefficient K3 for the brightness value of the pixel of the after frame image. Then, it synthesizes the pixels of the start frame image and the pixels of the after frame image for which the respective brightness coefficients were calculated, and generates the intermediate frame image data D2.

18 Claims, 10 Drawing Sheets

| INTERMEDIATE FRAME IMAGE COUNT N (NUMBER) | FIRST | SECOND | THIRD | FOURTH | FIFTH | SIXTH | SEVENTH |
|---|---|---|---|---|---|---|---|
| 1 | $(1/2)\pi$ | | | | | | |
| 2 | $(1/3)\pi$ | $(2/3)\pi$ | | | | | |
| 3 | $(1/4)\pi$ | $(1/2)\pi$ | $(3/4)\pi$ | | | | |
| 4 | $(1/5)\pi$ | $(2/5)\pi$ | $(3/5)\pi$ | $(4/5)\pi$ | | | |
| 5 | $(1/6)\pi$ | $(1/3)\pi$ | $(1/2)\pi$ | $(2/3)\pi$ | $(5/6)\pi$ | | |
| 6 | $(1/7)\pi$ | $(2/7)\pi$ | $(3/7)\pi$ | $(4/7)\pi$ | $(5/7)\pi$ | $(6/7)\pi$ | |
| 7 | $(1/8)\pi$ | $(1/4)\pi$ | $(3/8)\pi$ | $(1/2)\pi$ | $(5/8)\pi$ | $(3/4)\pi$ | $(7/8)\pi$ |

| θ (rd) | θ (deg) | K2 | K3 |
|---|---|---|---|
| 0 | 0 | 1.00 | 0.00 |
| (1/12)π | 15 | 0.98 | 0.02 |
| (1/6)π | 30 | 0.93 | 0.07 |
| (1/4)π | 45 | 0.85 | 0.15 |
| (1/3)π | 60 | 0.75 | 0.25 |
| (5/12)π | 75 | 0.63 | 0.37 |
| (1/2)π | 90 | 0.50 | 0.50 |
| (7/12)π | 105 | 0.37 | 0.63 |
| (2/3)π | 120 | 0.25 | 0.75 |
| (3/4)π | 135 | 0.15 | 0.85 |
| (5/6)π | 150 | 0.07 | 0.93 |
| (11/12)π | 165 | 0.02 | 0.98 |
| π | 180 | 0.00 | 1.00 |

Fig.11

MOVING IMAGE DISPLAY DEVICE AND METHOD FOR MOVING IMAGE DISPLAY

CLAIM OF PRIORITY

The present application claims priority from Japanese application P2005-314217A filed on Oct. 28, 2005, the content of which is hereby incorporated by reference into this application.

BACKGROUND

1. Field of the Invention

The present invention relates to technology for displaying moving images by consecutively displaying a plurality of frame images, and more specifically relates to technology for synthesizing a plurality of frame images and generating an intermediate frame image.

2. Description of the Related Art

In the past, when displaying images on a moving image display device such as a CRT, television or the like with a refresh rate of less than 60 Hz, there were cases when flicker (blinking) occurred on the overall screen. However, even when a sufficient refresh rate is secured, in cases when displaying moving images such as when a moving object moves on the screen, there were cases when flicker occurred only in the moving object part on the screen rather than on the overall screen. Hereafter, this kind of flicker is called "moving image flicker." This kind of phenomenon occurs frequently, for example, when displaying moving images that move at a fixed speed such as a person, car, airplane or the like within the screen, or moving images when panning the video camera at a fixed speed.

This kind of phenomenon is not limited to CRTs and televisions, but is also seen in cases when displaying moving images on moving image display devices such as liquid crystal displays, plasma displays, projectors or the like, on the display unit of a PDA, mobile phone or the like, or on the screen in a movie theater or the like, and this was a problem common to moving image display. There were cases when once the viewers became bothered by the existence of the moving image flicker described above, they felt stress while viewing.

Figure 2:
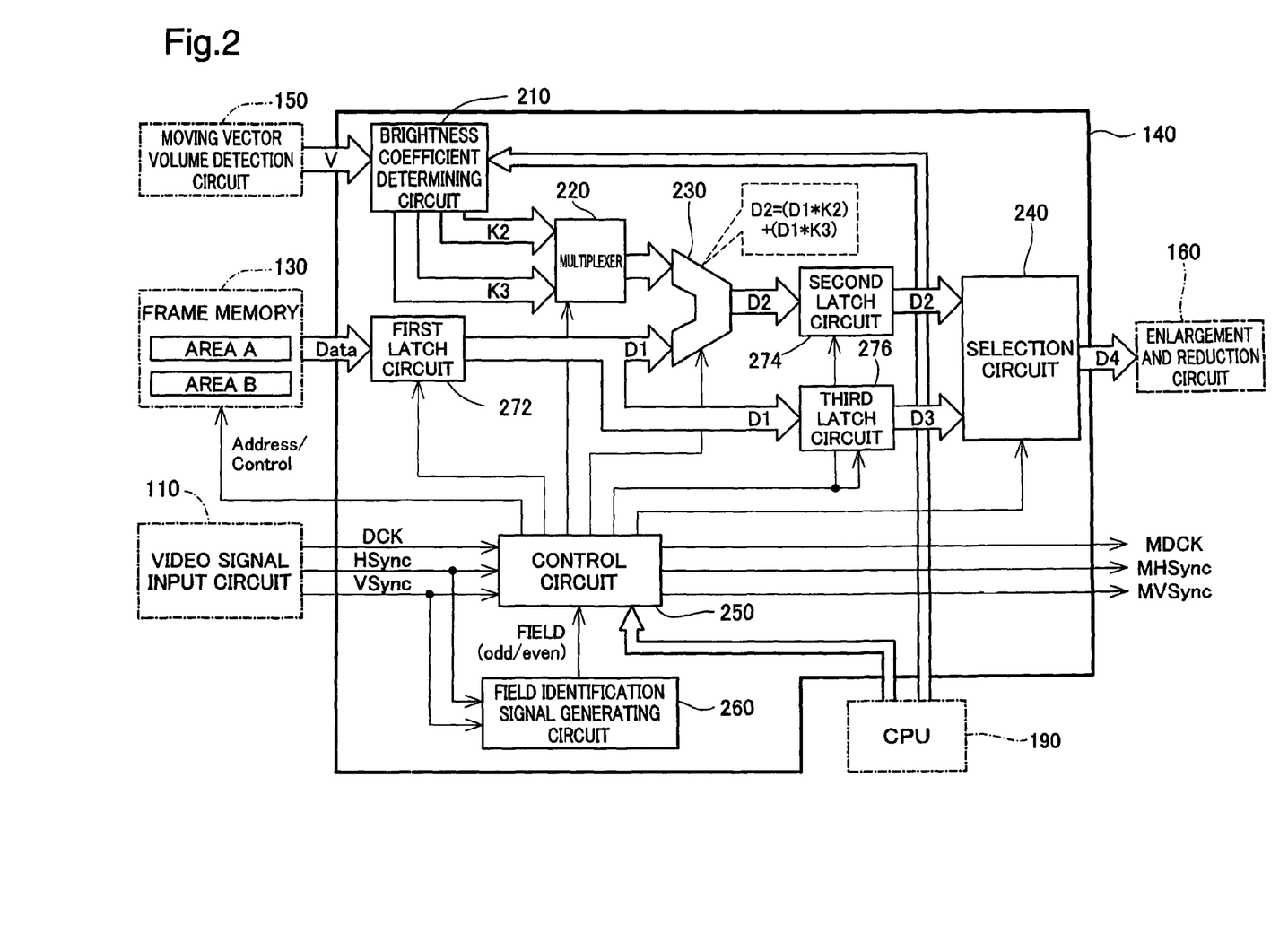
FIG. 2 is a block diagram showing the detailed constitution of the intermediate frame generating circuit 140.

Regarding this kind of problem, for example in JP-A-04-302289, disclosed is technology for displaying moving images smoothly by dynamically generating new intermediate frame images from two frame images to suppress the unnaturalness of the movement when displaying moving images in a liquid crystal moving image display device or the like having an approximately 100% light emitting time ratio. In specific terms, as shown in FIG. 2 of patent reference 1, if it is a video image for which a round mark moves from left to right on the screen, by newly drawing round marks that are at two positions intermediate to the round mark within the before and after frames, an intermediate frame image is generated.

Also, disclosed in JP-A-2001-296841 is technology that detects whether an input video image is a moving image or a still image, and when a moving image is displayed, switches to the optimal display method for moving image display by taking action to double the field frequency or the like.

However, with the prior art described above, because it is necessary to generate a completely new intermediate frame from two frame images, the calculation processing for this becomes huge, so it was difficult to improve the moving image display speed. Also, to generate a completely new intermediate frame, it is necessary to secure a large frame memory capacity, and this became a factor in increasing costs. Also, when switching the display method with moving images and still images, there was concern that smooth video image display would not be possible due to the occurrence of a virtual image during switching of the display method or the like.

SUMMARY

For one aspect of the present invention, the purpose is to suppress moving image flicker using a method that is simpler than in the past, and that displays smooth moving images.

To address the problem noted above, the moving image display device of the present invention is constituted as follows. Specifically, it is a moving image display device for displaying moving images by consecutively displaying a plurality of frame images, comprising:

input unit that inputs moving images for which a plurality of frame images are recorded at a specified frame rate;

reading unit that reads from the input moving image a consecutively displayed first frame image and second frame image;

brightness adjustment unit that performs brightness reduction processing to reduce the brightness based on a specified standard for at least one of the first frame image and the second frame image;

synthesis unit that generates one or more intermediate frame images by synthesizing the first frame image and the second frame image after executing the brightness reduction process; and display unit that displays the intermediate frame image before displaying the second frame image after displaying the first frame image, when displaying a moving image by displaying the first and second frame images.

With the moving image display device of the present invention, it is possible to generate an intermediate frame image by a very simple process of performing simple synthesis while adjusting the respective brightness of the consecutively displayed first frame image and second frame image, so it is possible to improve the processing speed. As a result, even when the frame rate is improved from the original moving image, it is easy to have the synthesizing process or the like follow that frame rate, and it becomes possible to suppress moving image flicker and to perform smooth moving image display.

Also, with the present invention, because intermediate frame images are generated using a very simple process of simply synthesizing the first frame image and the second frame image while adjusting their brightness, it is not necessary to generate a completely new intermediate frame. Therefore, it is possible to very simply constitute the hardware for performing this processing, and it is also possible to reduce the used memory capacity. Because of this, it is possible to provide a moving image display device for performing smooth moving image display while attempting to keep costs down.

Also, the present invention can also be used as a moving image display method, a program product for realizing that method on a computer, or a recording medium on which that program is recorded.

DESCRIPTION OF THE PREFERRED EMBODIMENTS

Following, to make even more clear the operation and effect of the present invention described above, a description is given in the following sequence based on embodiments of the aspects of the present invention.
A. First Embodiment:
(A-1) Projector Hardware Constitution:
(A-2) Constitution and Operation of the Intermediate Frame Generating Circuit:
(A-3) Effect:
B. Second Embodiment:
C. Modification:

A. First Embodiment

(A-1) Projector Hardware Constitution

Figure 1:
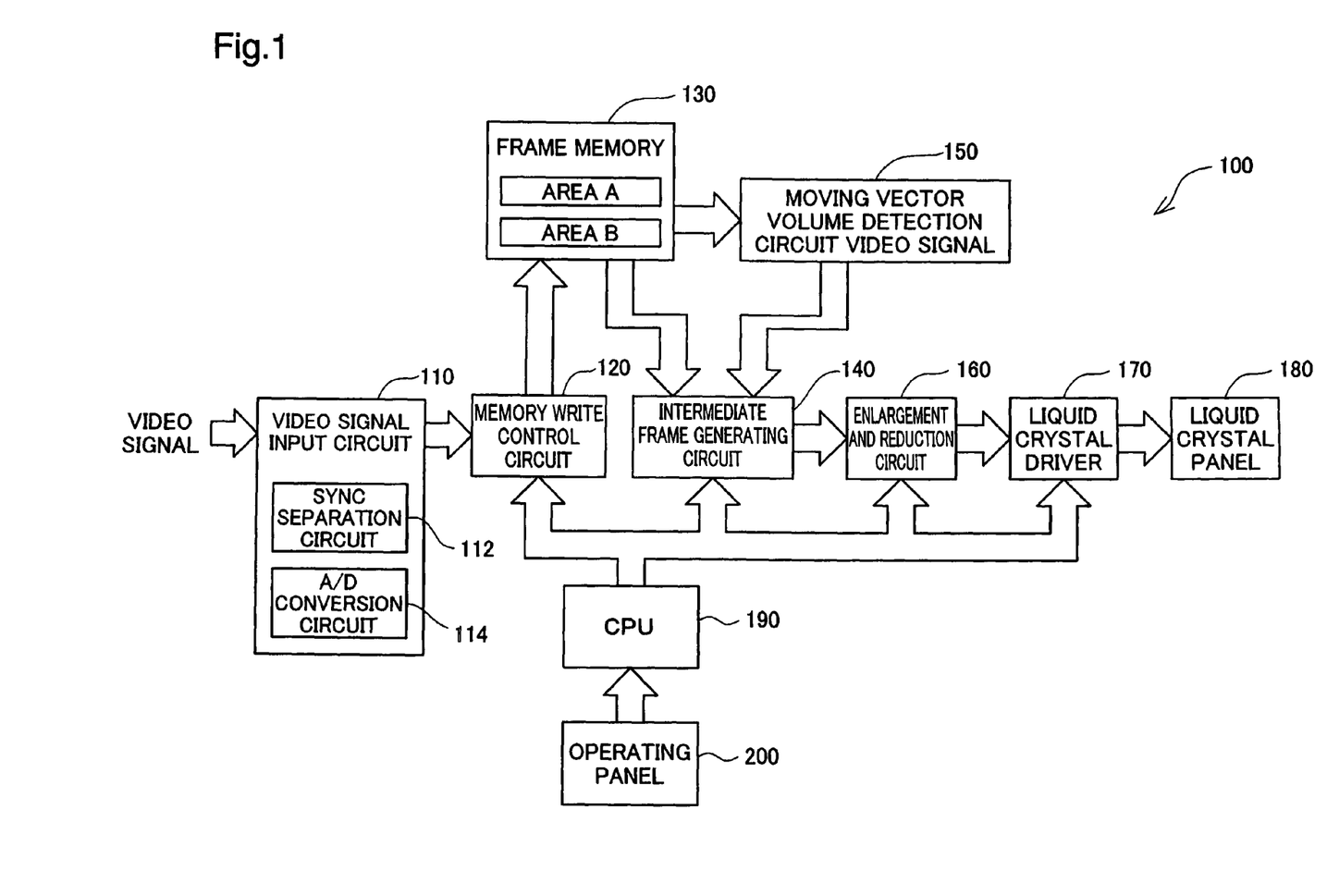
FIG. 1 is a block diagram showing the hardware constitution of the projector 100.

FIG. 1 is a block diagram showing the hardware constitution of the projector 100 as an embodiment of the moving image display device of the present invention. This projector 100 has a function of performing display of moving images by increasing by at least two times the frame rate of the original moving image. A detailed description will be given later regarding the specific constitution for performing display at two or more times the frame rate.

As shown in the drawing, the projector 100 of the present invention comprises a video signal input circuit 110, a memory write control circuit 120 connected to this video signal input circuit 110, a frame memory 130 connected to the memory write control circuit 120, a moving vector volume detection circuit 150 connected to the frame memory 130, the intermediate frame generating circuit 140 connected to the frame memory 130 and the moving vector volume detection circuit 150, an enlargement and reduction circuit 160 connected to the intermediate frame generating circuit 140, a liquid crystal driver 170 connected to the enlargement and reduction circuit 160, a liquid crystal panel 180 connected to the liquid crystal driver 170, a CPU 190 connected to the memory write control circuit 120, the intermediate frame generating circuit 140, the enlargement and reduction circuit 160, and the liquid crystal driver 170, and an operating panel 200 connected to the CPU 190.

The video signal input circuit 110 is a circuit for inputting video signals such as composite signals or S video signals from external devices such as a DVD player, video deck, personal computer or the like, and component signals or the like. These video signals are typically analog signals constituted from 1 to 30 frame images. The video signal input circuit 110 comprises a sync separation circuit 112 and an A/D conversion circuit 114.

The sync separation circuit 112 is a circuit that separates synchronization signals of the vertical synchronization signals VSync or horizontal synchronization signals HSync or the like from the input video signal. The sync separation circuit 112 also performs generation of a dot clock DCK using a PLL circuit or the like according to the synchronization of the vertical synchronization signals VSync or the horizontal synchronization signals HSync for which separation was performed. Note that when video signals for which synchronous signals are separated in advance are input, it is also possible to omit the sync separation circuit 112.

The A/D conversion circuit 114 is a circuit that converts the synchronous signal separated analog video signals to digital video signals. When the A/D conversion circuit 114 generates the digital video signal, this digital video signal is output to the memory write control circuit 120.

The memory write control circuit 120 writes the digital video signals input from the video signal input circuit 110 to the frame memory 130 for each frame. Two frames of write area are secured in the frame memory 140 ("area A" and "area B" in the drawing), and the memory write control circuit 120 writes the frame images alternately to these areas. Note that with this embodiment, two write areas are comprised, but it is also possible to comprise three or more write areas and to performing writing in sequence to these areas.

The moving vector volume detection circuit 150 is a circuit that detects the moving vector volume V of a moving object imaged within these frame images by comparing two frame images written in the frame memory 130. The moving vector volume V can be obtained by dividing the two frame images respectively into a plurality of blocks, and by detecting the change in brightness of each block common to both frame images. The detection of that moving vector volume can apply the known technology noted in JP-A-2003-69961, for example.

The intermediate frame generating circuit 140 generates intermediate frame image data by reading the two frame image data from the frame memory 130 and by synthesizing these while adjusting the brightness of these frame image data. The detailed constitution and operation of this intermediate frame generating circuit 140 is described later. When the intermediate frame image data is generated, the intermediate frame generating circuit 140 outputs to the enlargement and reduction circuit 160 this intermediate frame image data and the frame image data read from the frame memory 130.

The enlargement and reduction circuit 160 is a circuit that enlarges or reduces the frame image data input from the intermediate frame generating circuit 140 so as to match the resolution of the liquid crystal panel 180. Note that the enlargement/reduction of the frame image data can be performed when the memory write control circuit 120 writes the frame image to the frame memory 130, or can also be performed when the intermediate frame generating circuit 140 reads the frame image from the frame memory 130. In this case, it is possible to omit the enlargement and reduction circuit 160.

The liquid crystal driver 170 is a circuit that inputs the frame image data from the enlargement and reduction circuit 160 and drives the liquid crystal panel 180 according to that RGB gradation value.

The liquid crystal panel 180 is driven by the liquid crystal driver 170, and performs output image formation. The output image formed by the liquid crystal panel 180 is displayed by projection onto a projection screen by an optical system that is not illustrated.

The CPU 190 receives from the user using the operating panel 200 the synthesis mode (described later) or various setting operations when generating the intermediate frame, and performs control of the memory write control circuit 120, the intermediate frame generating circuit 140, the enlargement and reduction circuit 160, and the liquid crystal driver 170 according to these settings.

(A-2) Constitution and Operation of the Intermediate Frame Generating Circuit

FIG. 2 is a block diagram showing the detailed constitution of the intermediate frame generating circuit 140. As shown in the drawing, this intermediate frame generating circuit 140 comprises a brightness coefficient determining circuit 210 connected to the moving vector volume detection circuit 150, a multiplexer 220 connected to this brightness coefficient determining circuit 210, a first latch circuit 272 connected to the frame memory 130, a synthesizing circuit 230 connected to the multiplexer 220 and the first latch circuit 272, a second latch circuit 274 connected to the synthesizing circuit 230, a third latch circuit 276 connected to the first latch circuit 272, and a selection circuit 240 connected to the second latch circuit 274 and the third latch circuit 276. Furthermore, the intermediate frame generating circuit 140 comprises a control circuit 250, connected to the video signal input circuit 110, for controlling each circuit described above, and a field identification signal generating circuit 260.

The field identification signal generating circuit 260 inputs the horizontal synchronous signals HSync and the vertical synchronous signals VSync from the video signal input circuit 110 to generate field identification signals from these synchronous signals. The field identification signal is a signal for identifying whether the field to be displayed is an even numbered field or an odd numbered field for the interlace display method. When a field identification signal is generated, the field identification signal generating circuit 260 outputs that field identification signal to the control circuit 250.

The control circuit 250 inputs the horizontal synchronous signals HSync, the vertical synchronous signals VSync, and the dot clock DCK from the video signal input circuit 110, and also inputs the field identification signals from the field identification signal generating circuit 260, and based on these signals, reads the frame image data from the frame memory 130, and controls the operations of the first latch circuit 272, the second latch circuit 274, the third latch circuit 276, the multiplexer 220, the synthesizing circuit 230, and the selection circuit 240.

The control circuit 250 consecutively reads three times respectively the frame image data to be displayed at the start (hereafter called "start frame image") and the frame image data to be displayed after (hereafter called "after frame image") from the frame memory 130 internal area A and area B at twice the cycle of the original image frame rate (hereafter this kind of read is called "overscan"). At this time, by alternately reading for each pixel the third time start frame image and the first time after frame image, synchronous reading is performed (see the middle level in FIG. 5). From frame memory 130, it is possible to perform reading from each area using the burst mode. The frame image data overscanned in this way is held in pixel units by the first latch circuit 272. The first latch circuit 272 branches the frame image data D1 that holds the frame memory 130 internal areas A and B and outputs them to the synthesizing circuit 230 and the third latch circuit 276. The third latch circuit 276, of the frame image data D1 output from the first latch circuit 272, holds as the frame image data D3 only the data of the start frame image read the second time of three times.

The brightness coefficient determining circuit 210 determines the brightness coefficient K2 and the brightness coefficient K3 values according to the synthesis mode set by the CPU 190, and outputs signals representing these values to the synthesizing circuit 230. The brightness coefficient K2 is a parameter for adjusting the brightness of the start frame image that is the generating source of the intermediate frame image, and the brightness coefficient K3 is a parameter for adjusting the brightness of the after frame image that is the generating source of the intermediate frame image.

As the synthesis modes set by the CPU 190, there are the fixed mode and the variable mode. The fixed mode is a mode for which the brightness coefficient K2 and the brightness coefficient K3 are fixed to a constant value with no relation to the moving vector volume V. For this fixed mode, there are the "before and after equal mode" for which the brightness coefficient K2 and the brightness coefficient K3 are each 1, and there is no change between the start frame image and the after frame image brightness, the "before and after equal relaxation mode" for which the brightness coefficient K2 and the brightness coefficient K3 are common fixed values less than 1 (e.g. 0.7), the "after frame priority mode" for which the brightness of the after frame image is higher than that of the start frame image, the "before frame priority mode" for which the brightness of the start frame image is higher than that of the after frame image, and the like.

With the "before and after equal mode" and the "before and after relaxation mode," it is possible to make the brightness coefficient calculated for the start frame image and the after frame image the same value, so it is possible to try to simplify the processing. Also, with the "after frame priority mode," it is possible to generate an intermediate frame image for which the effect level of the after frame image is higher than that of the start frame image. In contrast to this, with the "before frame priority mode," it is possible to generate an intermediate frame image for which the effect level of the start frame image is higher than that of the after frame image.

In contrast to the fixed mode described above, the variable mode is a mode for which the brightness coefficient K2 and the brightness coefficient K3 values are varied according to the moving vector volume V input from the moving vector volume detection circuit 150. When the brightness coefficient determining circuit 210 is set to this mode, the brightness coefficient K2 and the brightness coefficient K3 are determined based on the brightness coefficient table shown in FIG. 3.

Figure 3:
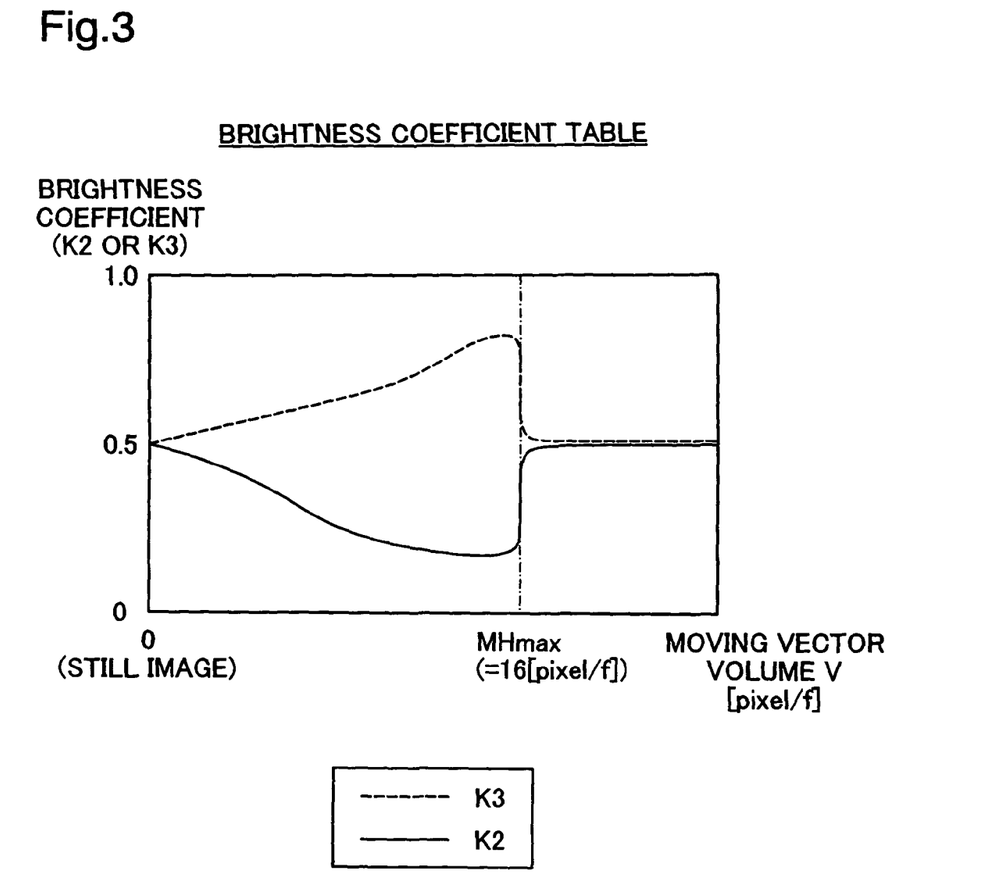
FIG. 3 is an explanatory drawing showing an example of the brightness coefficient table.

FIG. 3 is an explanatory drawing showing an example of the brightness coefficient table. In this brightness coefficient table, when the moving vector volume V is 0, specifically, when there is no movement between the before and after frames, and when the moving vector volume V exceeds the maximum visual limit value MHmax that human vision can follow, setting is done so that the brightness coefficient K2 and the brightness coefficient K3 are both 0.5. Also, when the moving vector volume V is greater than 0 and smaller than the maximum visual limit value MHmax, the larger that the moving vector volume V becomes, setting is done so that the brightness coefficient K3 is greater and the brightness coefficient K2 is smaller. Specifically, with this brightness coefficient table, in the normal moving vector volume V range, the greater the moving vector volume V is, the stronger the reflection of the effect of the after frame image on the intermediate frame image.

The various synthesis modes described above can be selected freely by the user according to the operation of the operating panel 200. The CPU 190 accepts the selection of the synthesis mode by the user and sets the selected synthesis mode in the brightness coefficient determining circuit 210. By doing this, it is possible for the user to flexibly set the synthesis mode suited to that moving image according to the purpose of the moving image display.

Note that when the projector 100 supports only the fixed mode, and does not support the variable mode, it is also possible to omit the moving vector volume detection circuit 150. By doing this, it is possible to try to simplify the process and to reduce costs. It is also possible to make it possible for the user to freely set the value of the brightness coefficient used with the fixed mode described above.

The multiplexer 220 inputs signals that represent the brightness coefficient K2 and the brightness coefficient K3 from the brightness coefficient determining circuit 210, time-multiplexes these signals, and outputs them to the synthesis circuit 230.

The synthesis circuit 230 inputs signals representing the brightness coefficient K2 and the brightness coefficient K3 from the multiplexer 220, and also inputs overscanned frame image data D1 from the first latch circuit 272 in pixel units. When the start frame image and the after frame image are input simultaneously from the first latch circuit 272, specifically, when the start frame image read the third time and the after frame image read the first time are input simultaneously, the synthesis circuit 230 calculates the brightness coefficient K2 in relation to the brightness value of the pixel of the start frame image, and calculates the brightness coefficient K3 in relation to the brightness value of the pixel of the after frame image. Then, the pixels of the start frame image and the pixels of the after frame image for which the respective brightness coefficients were calculated are synthesized based on the formula (1) noted below, and the intermediate frame image data D2 is generated. When the intermediate frame image data D2 is generated by the synthesis circuit 230, this intermediate frame image data D2 is held by the second latch circuit 274.

$$D2 = (\text{Start frame image } D1 * K2) + (\text{After frame image } D1 * K3) \quad (1)$$

When the intermediate frame image data D2 held by the second latch circuit 274 and the frame image data D3 held by the third latch circuit 276 are input, the selection circuit 240 alternately selects two data at doubled cycles of the original video image vertical synchronous signal VSync. Then, the selected frame image data is output to the enlargement and reduction circuit 160 as the frame image data D4. Note that from the control circuit 250, the dot clock MDCK, horizontal synchronous signals MHSync, and vertical synchronous signals MVSync necessary for displaying the frame image data D4 on the liquid crystal panel 180 are output to the enlargement and reduction circuit 160. In the case of this embodiment, the vertical synchronous signal MVSync is at a doubled cycle of the vertical synchronous signal VSync input from the video signal input circuit 110.

Figure 4:
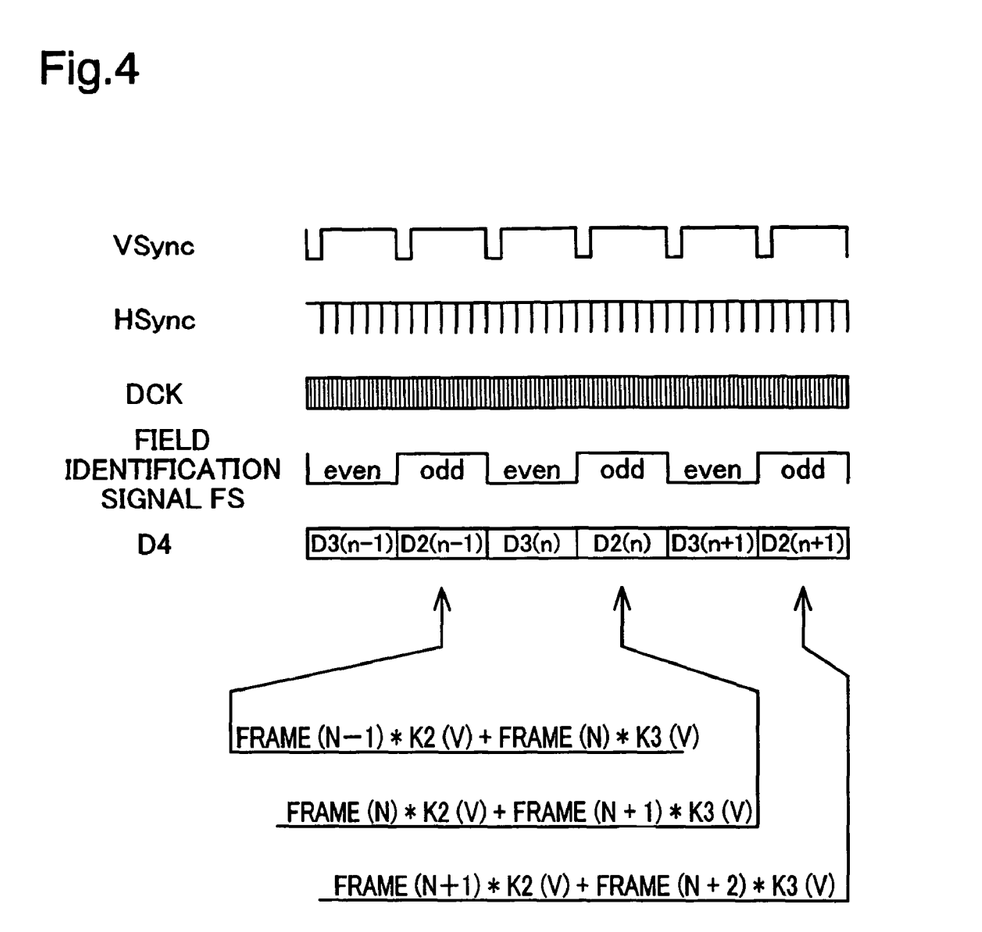
FIG. 4 is an explanatory drawing showing in simple form a timing chart of the operation of the intermediate frame generating circuit 140.

FIG. 4 is an explanatory drawing showing in simple form a timing chart of the operation of the intermediate frame generating circuit 140. With the intermediate frame generating circuit 140 described above, when the horizontal synchronous signal HSync, the vertical synchronous signal VSync, and the dot clock DCK are input from the video signal input circuit 110, the field identification signal FS is generated from these synchronous signals. Then, from the intermediate frame generating circuit 140, as the finally output frame image data D4, with the even timing which displays even numbered fields, the frame image data D3 (in the drawing, D3 (n−1), D3 (n), D3 (n+1)) is output acquired as is from the original moving image, and with the odd timing which displays odd numbered fields, the intermediate frame image data D2 (in the drawing, D2 (n−1), D2 (n), and D2 (n+1)) generated by the intermediate frame generating circuit 140 is output.

Figure 5:
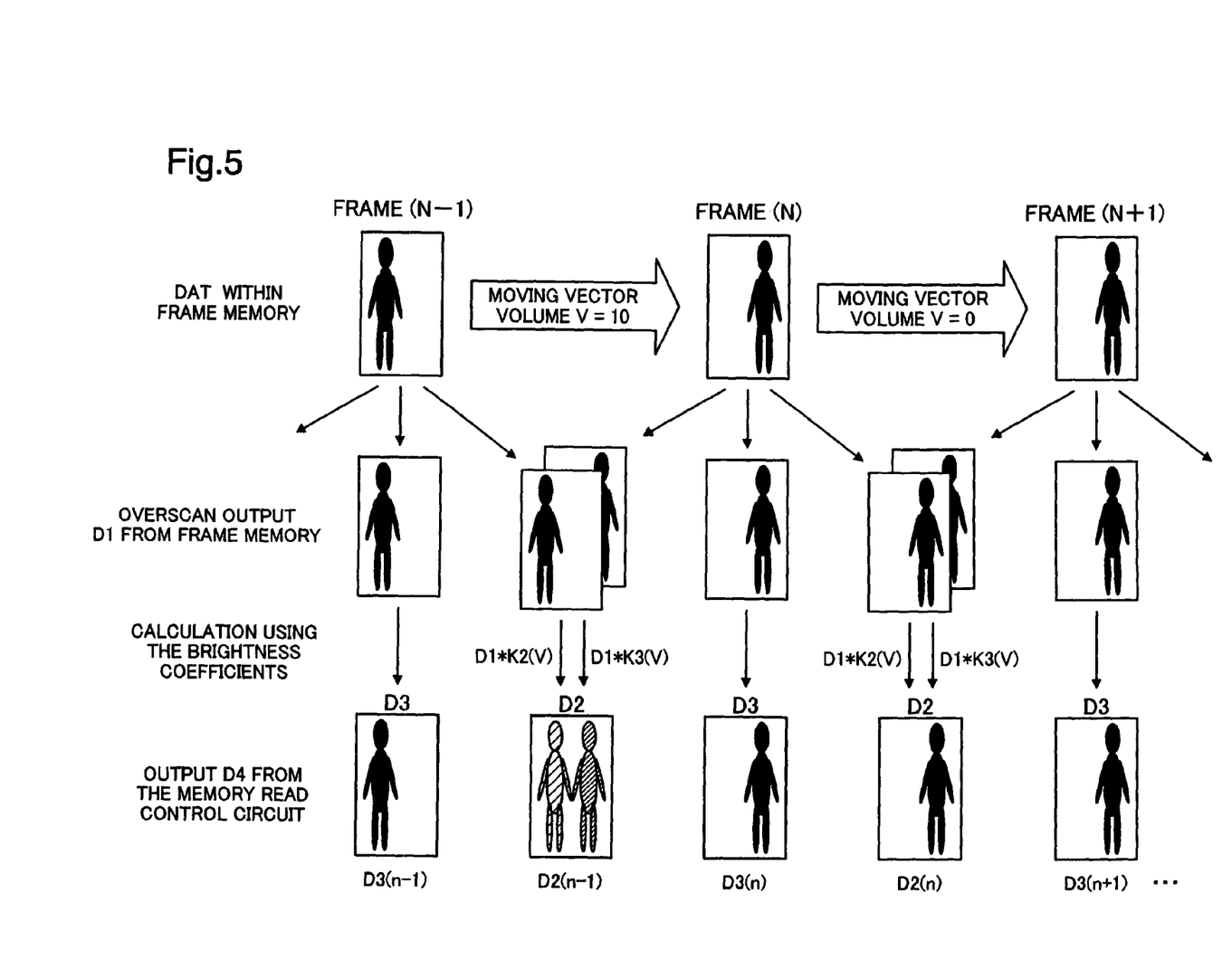
FIG. 5 is an explanatory drawing visually expressing the moving image formed on the liquid crystal panel 180 according to the frame image data output by the intermediate frame generating circuit 140.

FIG. 5 is an explanatory drawing visually expressing the moving image formed on the liquid crystal panel 180 according to the frame image data output by the intermediate frame generating circuit 140. Shown in the top level of the drawing is the frame image data stored in the frame memory 130, and shown in the middle level is the overscanned frame image data D1 from this frame memory. Also, shown at the lower level of the drawing is the frame image data D4 output from the selection circuit 240. For the frame image data D4 shown at the lower level of the drawing, shared frame numbers with those of the frame image data D4 are allocated.

As shown in the upper level of the drawing, within the frame memory 130 are stored in sequence the frame image data of frame (N−1), frame (N), and frame (N+1), and as shown in the middle section of the drawing, these frame images are overscanned by the control circuit 250, and each frame respectively has three items each output. Note that for convenience of illustration, for frame (N−1) and frame (N+1), among the three items, output for two items is shown. Of the three frame images overscanned in this way, for the second of the frame images, this is output as the frame image data D4 as is by the selection circuit 240. In contrast to this, for the third of the start frame images and the first of the after frame images, the brightness coefficients K2 and K3 are calculated and synthesized for the respective image brightness values by the synthesizing circuit 230, and the intermediate frame image data D2 is generated. Then, this intermediate frame image data D2 is selected by the selection circuit 240, and is output as the frame image data D4. As a result, as shown in the lower level of the drawing, as shown by D3, D2, D3, D2, . . . , the frame image data D3 that constituted the original moving image and the intermediate frame image data D2 generated by the intermediate frame generating circuit 140 are alternately output from the selection circuit 240, and that image is formed on the liquid crystal panel 180.

With the example shown in FIG. 5, the moving vector volume V between frame (N−1) and frame N is 10. Because of this, for the intermediate frame image data D2 which is the synthesis result of frame (N−1) and frame (N), the brightness coefficients K2 and K3 are determined according to this moving vector volume V and the brightness coefficient table shown in FIG. 3, and as a result of this, an image is synthesized for which the respective frame image brightness values are decreased. Meanwhile, since the moving vector value V between the frame (N) and frame (N+1) is 0, according to FIG. 3, both brightness coefficients K2 and K3 are 0.5, and the frame image D2 synthesized by these brightness coefficients ends up having the same contents as the original frame image.

(A-3) Effect

Figure 6:
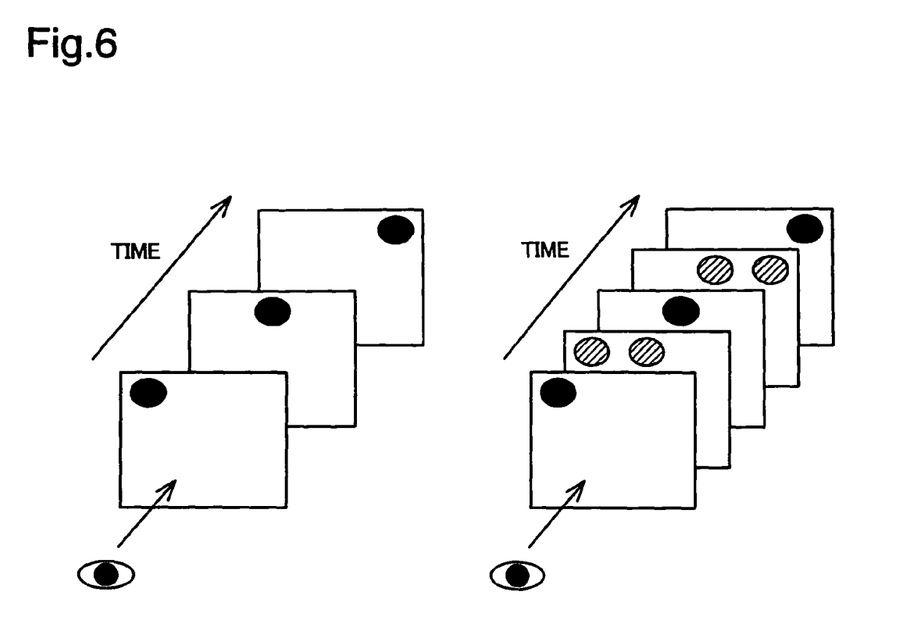
FIG. 6 is an explanatory drawing showing the effect of the embodiment.

FIG. 6 is an explanatory drawing showing the effect of the embodiment. Here, shown is an example for which a moving image is displayed where a black circle graphic moves from left to right. At the left side of the drawing, shown is an example of display when the intermediate frame image is not generated, and at the right side of the drawing, shown is an example of display when the intermediate frame image is generated in accordance with this embodiment. As shown at the right side of the drawing, when the intermediate frame image is not generated, the black circle display state is nothing more than changing display/non-display in two levels, so even when a suitable frame rate is secured, this is observed as if moving is discontinuous when the black circle moving speed is fast, and moving image flicker occurs. However, with this embodiment, as shown at the right side of the drawing, because intermediate frame images synthesized with adjustment of the brightness of the before and after frames are inserted between the frame images that constitute the original moving image, the black circles are observed as moving smoothly. Because of this, moving image flicker is reduced, so it is possible to reduce the burden of the user viewing.

Also, with this embodiment, because intermediate frame images are generated using a very simple process of simple synthesis while respectively adjusting the brightness of the start frame image and the after frame image, it is possible to improve the processing speed. As a result, even when the frame rate is increased by 2 or more times from the original moving image, having the synthesis process or the like follow that frame rate becomes easy, and it becomes possible to perform smooth display of moving images.

Also, with this embodiment, as described above, because the intermediate frame images are generated using a very simple process of simple synthesis while respectively adjusting the brightness of the start frame image and the after frame image, it is not necessary to generate a completely new intermediate frame image. Therefore, it is possible to constitute the digital circuit for performing this processing very simply, and also possible to reduce the used memory capacity. Because of this, it is possible to provide a projector capable of performing smooth moving image display while attempting to reduce costs.

Also, with this embodiment, even when there is switching between moving images and still images within the same video image, it is possible to generate the intermediate frame images using the same circuit and algorithm, suppressing the occurrence of moving image flicker for only the moving image. Because of this, it is not necessary to prepare two circuits, one for displaying moving images and one for displaying still images, or to perform the process of switching between these, so it is possible to constitute a circuit simply. This kind of effect is especially marked when performing output using the fixed mode while omitting the moving vector volume detection circuit 150 or the like.

B. Second Embodiment

With the first embodiment described above, described was a case when one intermediate frame image was generated and display of the moving image was performed at twice the frame rate of the original video image. In contrast to this, with the second embodiment, described is a case when two intermediate frame images are generated, and the moving image is displayed at a frame rate that is three times that of the original video image.

Figure 7:
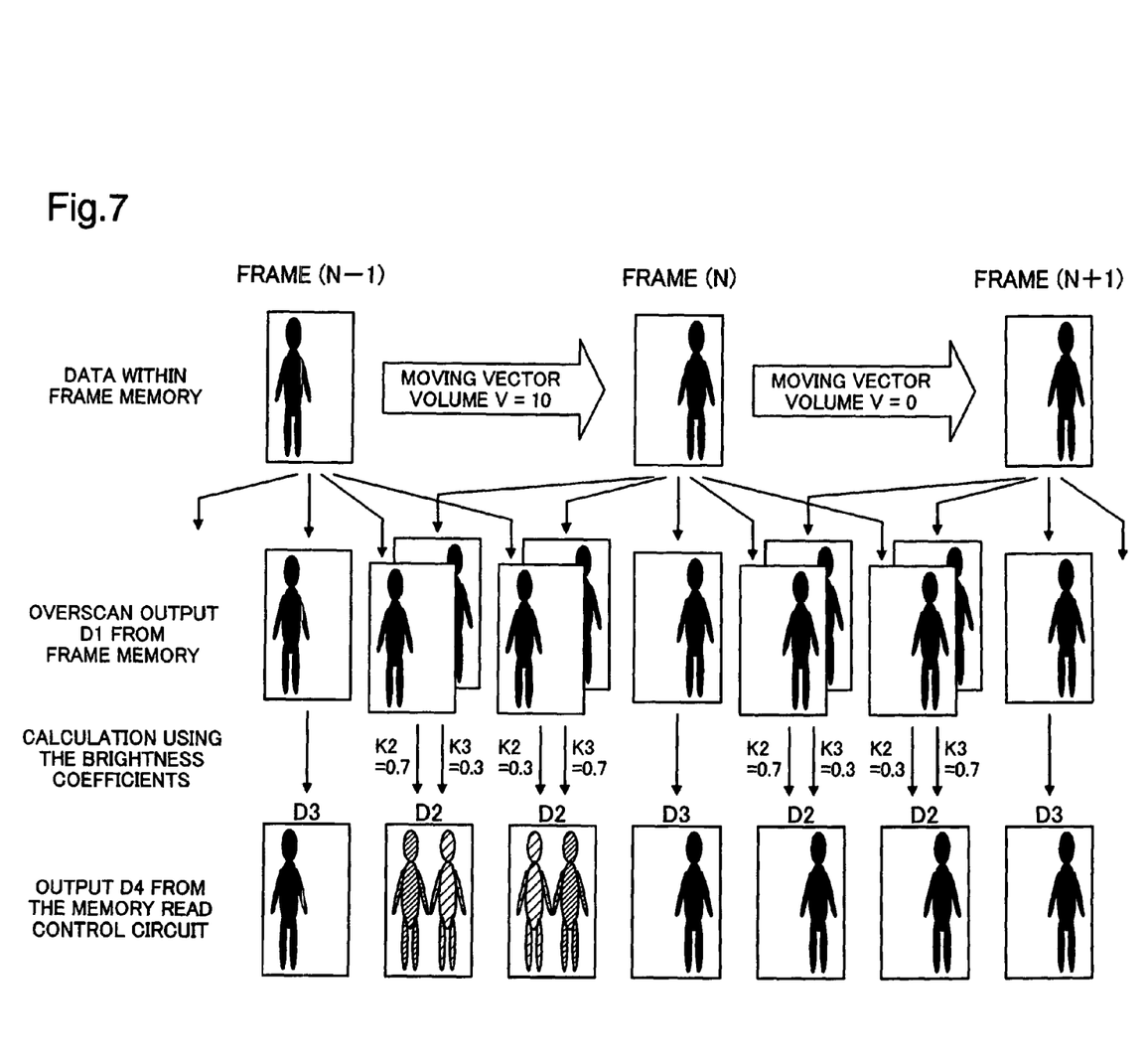
FIG. 7 is an explanatory drawing visually expressing the moving image formed on the liquid crystal panel 180 of the second embodiment.

FIG. 7 is an explanatory drawing visually expressing the moving image formed on the liquid crystal panel 180 of the second embodiment. As shown in the upper level and middle level of the drawing, with this embodiment, the memory write control circuit 120 writes in sequence to the frame memory 130 the frame image data frame (N−1), frame (N), and frame (N+1), and the control circuit 250 performs five consecutive readings at a doubled cycle of the frame rate of the original video image. At this time, simultaneous reading is performed by alternately reading respectively for each pixel the fourth start frame image and the first after frame image, and the fifth start frame image and the second after frame image. As a result, as shown at the lower level of the drawing, of the five items for which overscan was performed, for three frame images, these are output as is as the frame image data D4 by the selection circuit 240. In contrast to this, for the fourth start frame image and first after frame image, and the fifth start frame image and second after frame image described above, the brightness coefficients K2 and K3 are calculated for the respective image brightness values by the synthesis circuit 230 and then synthesized, and the intermediate frame image data D2 is generated. Then, this intermediate frame image data D2 is selected by the selection circuit, and is output as the frame image data D4.

With the example shown in FIG. 7, the brightness coefficient K2 and the brightness coefficient K3 values are calculated at respectively different combinations with the first intermediate frame image data D2 and the second intermediate frame image data D2 of the two consecutively generated intermediate frame image data D2. In specific terms, with the first intermediate frame image, the brightness coefficient K2 is 0.7 and the brightness coefficient K3 is 0.3, and with the second intermediate frame image, the brightness coefficient K2 is 0.3 and the brightness coefficient K3 is 0.7. By working in this way, there is a gradual decrease in the brightness of the start frame image, and a gradual increase in the brightness of the after frame image, and it is possible to obtain an effect of the moving object gradually moving.

Note that with FIG. 7, shown is an example with the values of brightness coefficients K2 and K3 respectively fixed, but, for example, it is also possible to determine the values of the brightness coefficient K2 and the brightness coefficient K3 using the brightness coefficient table shown in FIG. 3 for the first intermediate frame image, and to determine the values of the brightness coefficients by interchanging the values of the first [frame] brightness coefficient K2 and the brightness coefficient K3 for the second intermediate frame image. It is also possible to individually prepare a table for determining the first [frame] brightness coefficients K2 and K3 and a table for determining the second [frame] brightness coefficients K2 and K3.

Because with the second embodiment described above, it is possible to generate and display more intermediate frame images than with the first embodiment, it is possible to further suppress the occurrence of moving image flicker. Note that with this embodiment, described was a case of generating two intermediate frame images, but it is also possible to use the same method by respectively determining the brightness coefficients K2 and K3 for each intermediate frame image even when generating three or more intermediate frame images. In this case, display of each frame image is performed by multiplying the frame rate of the original video image by a multiple according to the number of intermediate frame images. If the number of intermediate frame image is increased, it is possible to increase the effect of decreasing the moving image flicker by a corresponding amount.

C. Modifications

Above, various embodiments of the present invention were described, but the present invention is not limited to these embodiments, and it goes without saying that various constitutions can be used within a scope that does not stray from its key points. For example, it is also possible to have this be an item for which the moving images are displayed by a computer by realizing using software the functions that were realized by hardware. In addition, the following kinds of variations are also possible.

(C-1) Modification 1

Figure 8:
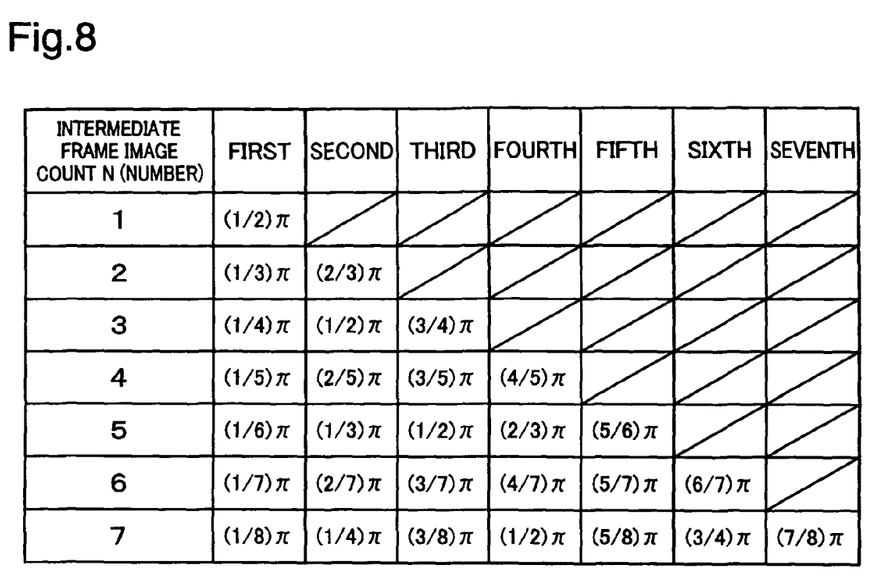
FIG. 8 is a drawing showing a table on which are defined values obtained by dividing the space from 0 to π using the number of intermediate frame images.
Figure 9:
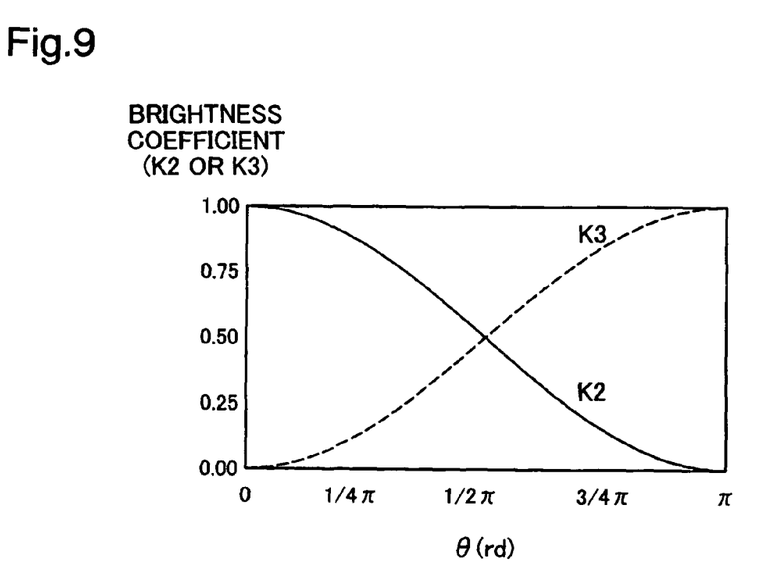
FIG. 9 is a drawing on which are graphed the functions used for the determination of the brightness coefficients.
Figure 10:
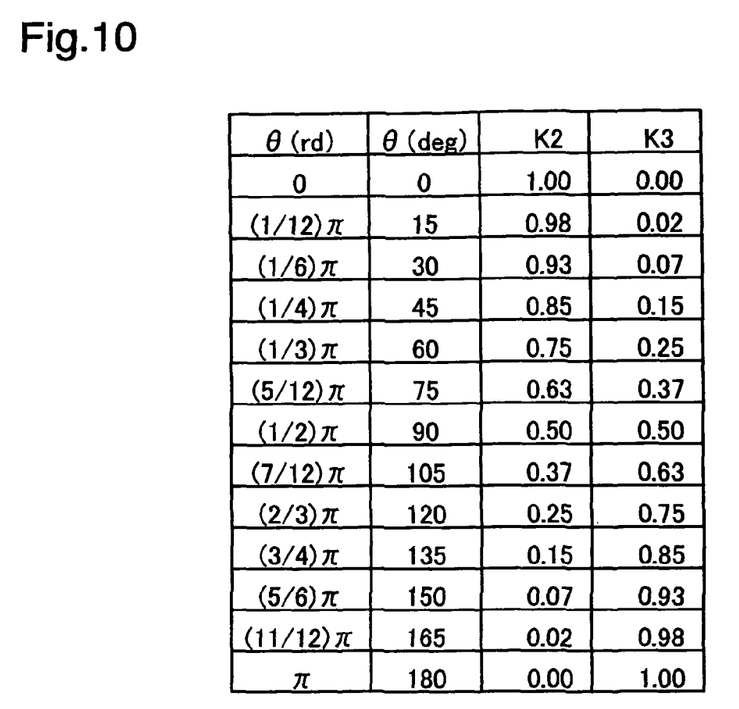
FIG. 10 is a drawing showing a specific example of the values of the brightness coefficient K2 and the brightness coefficient K3 corresponding to the angle θ.

Following, using FIG. 8 through FIG. 10, described is a modification of the method of determining the brightness coefficients K2 and K3. With this modification, the brightness coefficient determining circuit 210 shown in FIG. 2 determines the values of the brightness coefficients K2 and K3 according to the number n of intermediate frame images to be generated and the sine wave characteristics, with no relation to the moving vector volume V.

With this modification, when the number of intermediate frame images for which to perform generation using the synthesizing circuit 230 is set from the CPU 190, the brightness coefficient determining circuit 210 determines the angle θ (rd) (0<θ<π) for obtaining the brightness coefficient K2 and K3 for each intermediate frame image based on the table shown in FIG. 8. The values obtained by dividing the space from 0 to π by the number of intermediate frame images are defined in the table shown in FIG. 8. According to this table, for example when generating three intermediate frame images, the θ for generating the first intermediate frame image is (¼) π, the second is (½) π, and the third is (¾) π. Then, as the value of this θ, using the sine function shown in the following formulas (2) and (3), the respective brightness coefficients K2 and K3 used for generating each intermediate frame image are determined. Formula (2) below is a function representing from the sine function maximum value (=1) to the minimum value (=0), and formula (3) is the function representing from the sine function minimum value (=0) to the maximum value (=1). FIG. 9 shows a graphed image of the following functions, and FIG. 10 shows specific examples of the values of the brightness coefficient K2 and the brightness coefficient K3 corresponding to the angle θ.

$$K2=(\cos \theta)/2+0.5 \quad (2)$$

$$K3=0.5-(\cos \theta)/2 \quad (3)$$

Referring to FIG. 10, according to the functions (2) and (3) noted above, when generating three intermediate frame images, the brightness coefficient K2 used for the first intermediate frame image is 0.85 and the brightness coefficient K3 is 0.15. Also, the brightness coefficient K2 used for the second intermediate frame image is 0.50 and the brightness coefficient K3 is 0.50. Furthermore, the brightness coefficient K2 used for the third intermediate frame image is 0.15 and the brightness coefficient K3 is 0.85.

With the method of determining the brightness coefficient described above, it is possible to determine the brightness coefficient used for each intermediate frame image according to the wave characteristics of the sine wave. The brightness change following characteristics of the human eye are thought to approximate this sine wave characteristic, and with this modification, even when the number of intermediate frame images is increased, the moving image brightness change is very smooth, and it is possible to effectively suppress the moving image flicker.

Figure 11:
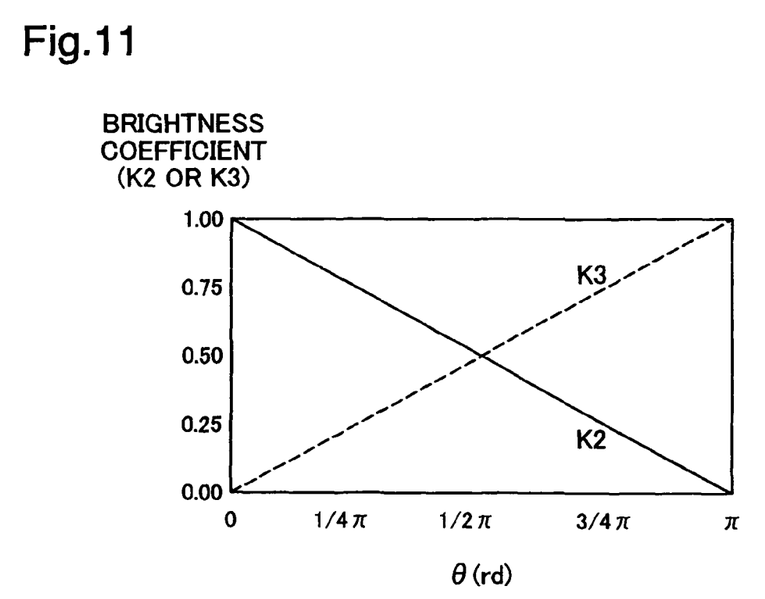
FIG. 11 is a drawing on which are graphed the functions for which the brightness coefficient K3 increases linearly from 0 to 1 and the brightness coefficient K2 decreases linearly from 1 to 0.

Note that with this modification the brightness coefficients were found using the sine function, but in addition to this, it is also possible to find the brightness coefficients using various functions that gradually increase or gradually decrease. FIG. 11 shows an example of this kind of function.

FIG. 11 is a drawing on which are graphed the functions for which the brightness coefficient K3 increases linearly from 0 to 1 and the brightness coefficient K2 decreases linearly from 1 to 0. Even with this kind of function, it is possible to obtain an effect of having the effect of the start frame image gradually decrease, and having the effect of the after frame image gradually increase, so it is possible to perform smooth moving image display.

Note that with this modification, the functions shown in FIG. 9 and FIG. 11 are functions for which the value when the brightness coefficient K2 and the brightness coefficient K3 are added is always 1. Because of this, it is possible to reduce the moving image flicker without decreasing the brightness of the intermediate frame image in relation to the normal frame image.

(C-2) Modification 2

With the embodiment noted above, shown was an example of determining the brightness coefficients K2 and K3 according to the moving vector volume between the two frame images stored in the frame memory 130. In contrast to this, it is also possible to determine the brightness coefficients K2 and K3 according to the volume of change in brightness of the two frame images.

In this case, for example, the brightness coefficient determining circuit 210 first finds the average value of the brightness of each pixel that constitutes the start frame image, and the average value of the brightness of each pixel that constitutes the after frame image, and then the change volume of the brightness is found from these average values. Then, if this change volume is in the plus direction, the value of the brightness coefficient K2 calculated for the start frame image is lower than the brightness coefficient K3 calculated for the after frame image according to this change volume. On the other hand, if it is in the minus direction, it is possible to have the value of the brightness coefficient K2 calculated for the start frame image be higher than the brightness coefficient K3 calculated for the after frame image according to this change volume. Even with this kind of modification, it is possible to display moving images smoothly.

(C-3) Modification 3

With the embodiment noted above, shown was an example for which the moving image display device of this application was constituted as the projector 100, but it is also possible to constitute the moving image display device as a liquid crystal display, a CRT display, a plasma display or the like. In this case, the liquid crystal driver 170 and the liquid crystal panel 180 shown in FIG. 1 are items that can be replaced with drive circuits or display devices suited to each display device. It is also possible to vary the brightness coefficient according to the various types of these display devices.

(C-4) Modification 4

With the embodiment described above, when generating the intermediate frame image, the intermediate frame image was generated by adjusting the brightness value of the before and after frames. In contrast to this, for example, it is also possible to generate intermediate frame images by adjusting the hue or color, or any of the values among the R, G, and B values. Of course, it is also possible to perform adjustment with these parameters combined.

(C-5) Modification 5

With the embodiment described above, reading of images from the frame memory 130 by the control circuit 250 or brightness adjustment and synthesis of images by the synthesizing circuit 230 were described as being performed in pixel units. However, the units for performing these processes do not have to be pixel units, but performance can also be done using frame units, line units, or scan line units. It is possible to determine which unit to perform processes with according to the data capacity that can be held by each latch circuit or the buffer capacity within the synthesizing circuit 230.

(C-6) Modification 6

With the second embodiment described above, shown was an example of generating two intermediate frame images. In contrast to this, with this modification, display is performed with the brightness of one intermediate frame image among the plurality of generated intermediate frame images decreased to be lower than that of the other intermediate frame images.

Figure 12:
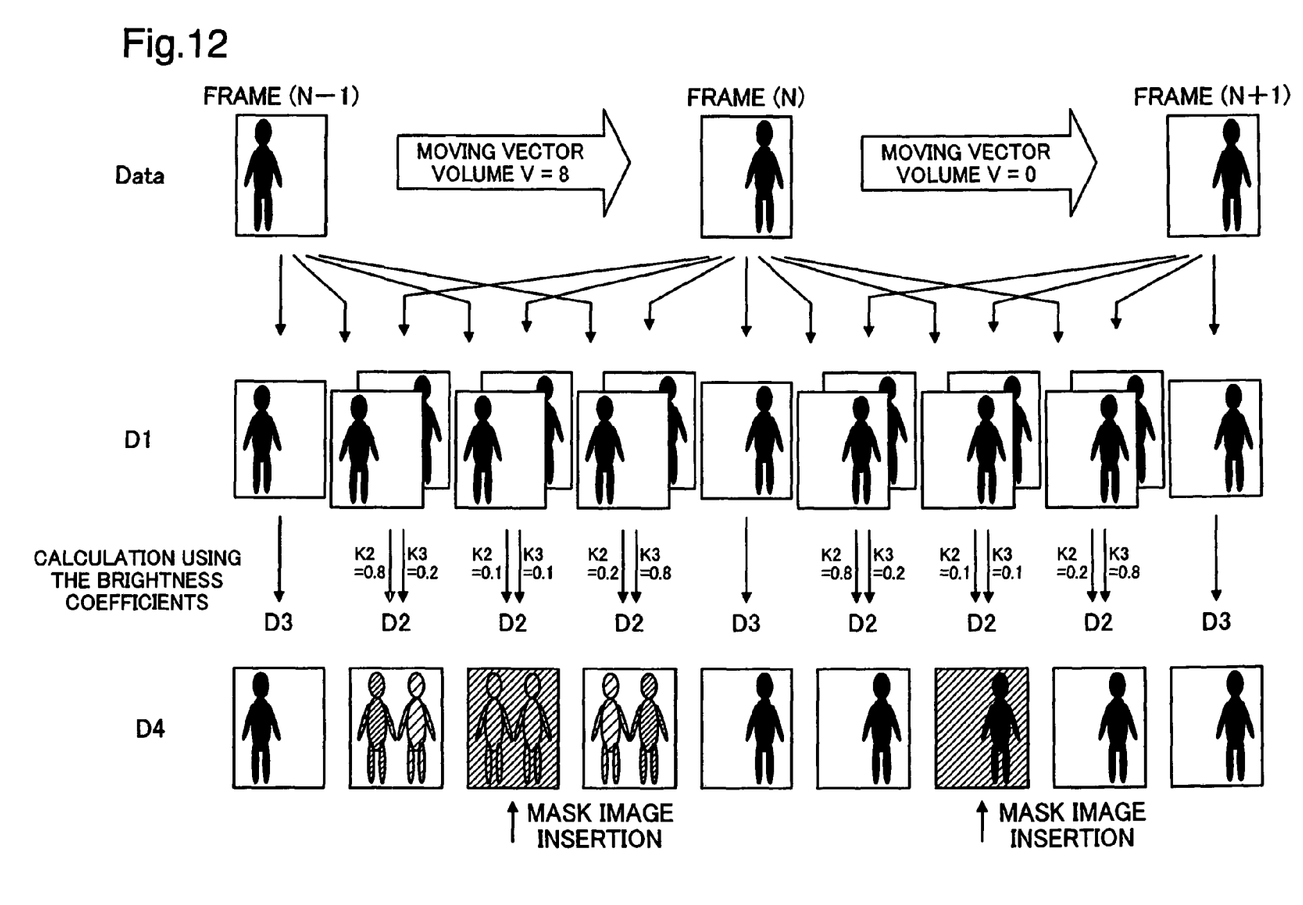
FIG. 12 is an explanatory drawing showing an example of generating the intermediate frame image with modification 6.

FIG. 12 is an explanatory drawing showing an example of generating the intermediate frame image with this modification. With the example shown in the drawing, three intermediate frame images are generated, and among these, for one of the intermediate [frame images], both the brightness coefficient K2 used for the start frame image and the brightness coefficient K3 used for the after frame image are 0.1, and the sum total value of these is less than 1. In this way, if an intermediate frame image that uses low brightness coefficients is generated, a mask image that is darker than the other frame images is displayed at a fixed timing. In this way, if a dark mask image is displayed at regular cycles, it is possible to suppress the residual image phenomenon specific to hold type display devices such as liquid crystal panels or the like.

Note that with this modification, by using low brightness coefficients for both the start frame image and the after frame image, a dark intermediate frame image was generated. In contrast to this, with the timing of displaying one intermediate frame image of the plurality of intermediate frame images, it is also possible to change to that intermediate frame image, and to insert a specified mask image to lower the brightness to make a black image for display. As this kind of mask image, it is possible to prepare in advance images made only from low brightness pixels such as black color. The device for inserting the mask image can be the synthesizing circuit 230 or can be the selection circuit 240 or the enlargement and reduction circuit 160. Even with this kind of constitution, it is possible to easily suppress the residual image phenomenon. Also, with FIG. 12, three intermediate frame images are generated, and of these, one is a dark image, but it is also possible to have one be a dark image as long as there are two or more intermediate frame images generated.

For the embodiments of the moving image display device of the present invention, we described these together with modifications, but it is also possible to use the following constitutions as aspects of the moving image display device of the present invention.

As one aspect of the moving image display device of the present invention, it is possible to realize an item for performing the aforementioned brightness reduction process by respectively calculating the first brightness coefficient of 0 or greater but less than 1 for the brightness value of the first frame image for the brightness adjustment unit, and a second brightness coefficient of 0 or greater and less than 1 for the brightness value of the second frame image. With this kind of constitution, it is possible to easily adjust the brightness of each frame image by using the brightness coefficients.

In this case, the first brightness coefficient and the second brightness coefficient can be the same value. With such a constitution, it is not necessary to individually determine brightness coefficients for the first frame image and the second frame image, so it is possible to simplify the processing.

As another aspect, it is conceivable to have the first brightness coefficient be a larger value than the second brightness coefficient for the brightness adjustment unit. With such a constitution, it is possible to make the brightness of the first frame image higher than the brightness of the second frame image, so it is possible to generate an intermediate frame image for which the effect of the first frame image that is displayed first in terms of time is heightened.

Alternatively, it is also possible to have the first brightness coefficient be a smaller value than the second brightness coefficient for the brightness adjustment unit. By doing this, it is possible to have the brightness of the first frame image be lower than the brightness of the second frame image, so it is possible to generate an intermediate frame image for which the effect of the second frame image which is displayed afterwards in terms of time is heightened.

As another aspect of the moving image display device, it is further possible to have a moving vector volume detection unit that finds the moving vector volume of the moving object imaged within these frame images from the first frame image and the second frame image, and for the brightness adjustment unit, to determine the first brightness coefficient and the second brightness coefficient according to the moving vector volume. With this constitution, it is possible to determine the brightness coefficient according to the movement vector volume between the two frame images, so it is possible to perform smoother moving image display.

Alternatively, it is also possible to constitute the brightness adjustment unit as one that determines the first brightness coefficient and the second brightness coefficient based on the table for which the relationship of the first and second brightness coefficients is predefined. With this kind of constitution, it is possible to determine the brightness coefficient according to the moving vector volume simply be referencing the table, so it is possible to increase the processing speed.

Furthermore, it is also possible to have this be equipped with a brightness change volume detection unit that finds from the first frame image and the second frame image the change volume of the brightness between these frame images, and to have an item that determines the first brightness coefficient and the second brightness coefficient according to the brightness change volume. With this constitution, it is possible to determine the brightness coefficient according to the brightness change volume between the two frame images, so it is possible to perform smoother moving image display.

Alternatively, it is also possible to have the brightness adjustment unit respectively determine the first brightness coefficient and the second brightness coefficient for generating each intermediate frame image according to the number of intermediate frame images generated by the synthesizing unit. By doing this, it is possible to calculate each brightness coefficient individually for the plurality of generated intermediate frame images, so it is possible to perform smoother moving image display.

As another aspect of the moving image display device, it is possible to generate two or more intermediate frame images, and with the brightness adjustment unit, for the intermediate frame images displayed on the first frame image side, to perform the aforementioned brightness reduction processing with the first brightness coefficient at a value greater than that of the second brightness coefficient, and for the intermediate frame images displayed at the second frame image side, to perform the brightness reduction processing with the first brightness coefficient at a value lower than that of the second brightness coefficient. With this constitution, it is possible to generate an intermediate frame image for which the brightness of the first frame image gradually decreases while the brightness of the second frame image gradually increases, so it is possible to perform smoother moving image display.

Furthermore, for the brightness adjustment unit, it is also possible to prepare a first function that gradually increases from 0 to 1 in a designated space and a second function that gradually decreases from 1 to 0, to divide this designated space according to the number of intermediate frame images, and to determine the first brightness coefficient and the second brightness coefficient based on the values of the first and second functions at the division point. By doing this, it is possible to easily determine the brightness coefficients according to the first function and the second function.

Here, the aforementioned first function and the aforementioned second function for the brightness adjustment unit can be functions that represent from the minimum value to the maximum value of the sine function. By doing this, it is possible to determine the brightness function based on the function representing the sine wave that approximates the brightness change following characteristics of the human eye, so it is possible to perform smoother moving image display.

Also, as an aspect of implementing this moving image display device, it is also possible to perform the first frame image and the second frame image read process, brightness reduction process, and synthesis process using any units from among the frame image frame units, line units, pixel units, or scan line units. By doing this, it is possible to generate the intermediate frame images using the optimal unit set taking into account the frame memory capacity that the moving image display device has or the like. Note that with the reading unit, the brightness adjustment unit, and the synthesis unit, it is possible to perform each process with the same respective units, or to perform each process with different respective units.

Alternatively, it is also possible to perform display by multiplying the frame rate for the display unit according to the number of generated intermediate frame images. By doing this, it is possible to perform display with a heightened frame rate of the moving image while inserting intermediate frame images, so it is possible to perform smoother moving image display.

Also, as an aspect of the moving image display device, it is possible to have the synthesis unit generate two or more intermediate frame images, and at the timing when the display unit displays one intermediate frame image of the two or more intermediate frame images, to change to this one intermediate frame image, and to perform display of a specified mask image with low brightness. Note that as the mask image, it is possible to have the total brightness coefficient be less than 1 and use an image with reduced brightness, or to use an image that was constituted in advance using only low brightness pixels such as black color or the like.

Furthermore, it is possible to have the synthesis unit generate two or more intermediate frame images, and of the intermediate frame images generated by the synthesis unit, to have the total of the first brightness coefficient and the second brightness coefficient used for the specified one intermediate frame image be less than 1.

Using these constitutions, when displaying a plurality of intermediate frame images, it is possible to display one of those intermediate frame images as a low brightness mask image. Because of this, in addition to suppressing moving image flicker, it is also possible to suppress the residual image phenomenon specific to hold type display devices such as liquid crystal display panels and the like.

Note that in addition to being able to implement the present invention as the moving image display device described above, it is also possible to implement this as a moving image display method or a computer program. This computer program can also be recorded on a computer readable recording medium. As the recording medium, for example, it is possible to use various media such as a flexible disk, CD-ROM, DVD-ROM, optical magnetic disk, memory card, hard disk, or the like.

The present invention can be implemented with a variety of aspects within a scope that does not change its key points. The contents of the present invention are determined by its technical concept.

What is claimed is:

1. A moving image display device for displaying moving images by displaying in sequence a plurality of frame images, comprising the following:
    input unit that inputs moving images on which a plurality of frame images are recorded at a specified frame rate;
    reading unit that reads a first frame image and a second frame image displayed consecutively from the input moving image;
    brightness adjustment unit that performs the brightness reduction process of reducing the brightness for at least any one of the first frame image and the second frame image;
    synthesis unit that generates one or more intermediate frame images by synthesizing the first frame image and the second frame image after executing the brightness reduction process; and
    display unit that displays the intermediate frame after display of the first frame image and before display of the second frame image, when displaying moving images by displaying in sequence the plurality of frame images including the first and second frame images.

2. A moving image display device in accordance with claim 1, wherein
    for the brightness adjustment unit, the brightness reduction process is performed by respectively calculating a first brightness coefficient of 0 or greater but less than 1 for the brightness value of the first frame image, and a second brightness coefficient of 0 or greater but less than 1 for the brightness value of the second frame image.

3. A moving image display device in accordance with claim 2, wherein
    the first brightness coefficient and the second brightness coefficient for the brightness adjustment unit are the same value.

4. A moving image display device in accordance with claim 2, wherein
    the first brightness coefficient for the brightness adjustment unit is a value larger than the second brightness coefficient.

5. A moving image display device in accordance with claim 2, wherein
    the first brightness coefficient for the brightness adjustment unit is a value smaller than the second brightness coefficient.

6. A moving image display device in accordance with claim 2, further comprising a moving vector volume detection unit that finds from the first frame image and the second frame image moving vector volume of a moving object imaged within these frame images, the moving vector volume including a direction and a speed of the movement of the moving object; and
    wherein the brightness adjustment unit determines the first brightness coefficient and the second brightness coefficient according to the moving vector volume.

7. A moving image display device in accordance with claim 6, wherein
the brightness adjustment unit determines the first brightness coefficient and the second brightness coefficient based on the moving vector volume and a table in which is predefined the relationship of the first and second brightness coefficients.

8. A moving image display device in accordance with claim 2, further comprising a brightness change volume detection unit that finds brightness change volume between these frame images from the first frame image and the second frame image, and
wherein the brightness adjustment unit determines the first brightness coefficient and the second brightness coefficient according to the brightness change volume.

9. A moving image display, device in accordance with claim 2, wherein
the brightness adjustment unit respectively determines the first brightness coefficient and the second brightness coefficient for generating each intermediate frame image according to the number of intermediate frame images generated by the synthesis unit.

10. A moving image display device in accordance with claim 9, wherein
the synthesis unit generates two or more of the intermediate frame images, and
the brightness adjustment unit performs the brightness reduction process with the first brightness coefficient as a larger value than the second brightness coefficient for the intermediate frame images displayed on the first frame image side, and performs the brightness reduction process with the first brightness coefficient as a smaller value than the second brightness coefficient for the intermediate frame images displayed on the second frame image side.

11. A moving image display device in accordance with claim 9, wherein
the brightness adjustment unit prepares a first function that gradually increases from 0 to 1 in a specified space, and a second function that gradually decreases from 1 to 0, divides that specified space according to the number of the intermediate frame images, and determines the first brightness coefficient and the second brightness coefficient based on the value of the first and second functions at the division point.

12. A moving image display device in accordance with claim 11, wherein
the first function and the second function for the brightness adjustment unit are functions representing from the minimum value to the maximum value of the sine function.

13. A moving image display device in accordance with claim 2, wherein
the synthesis unit generates two or more intermediate frame images, and
the brightness adjustment unit has the total of the first brightness coefficient and the second brightness coefficient used for the specified one intermediate frame image of the intermediate frame images generated by the synthesis unit be less than 1.

14. A moving image display device in accordance with claim 1, wherein
any of the frame image read process, the brightness reduction process, and the synthesis process of the first frame image and the second frame image is performed using any one of the units among frame unit, the line unit, the pixel unit, and the scan line unit of the frame image.

15. A moving image display device in accordance with claim 1, wherein
the display unit performs the display with the frame rate multiplied according to the number of the generated intermediate frame images.

16. A moving image display device in accordance with claim 1, wherein
the synthesis unit generates two or more intermediate frame images, and
the display unit, at the timing of displaying one intermediate frame image of the two or more intermediate frame units, changes to that one intermediate frame image, and performs display of a specified mask image of low brightness.

17. A moving image display method by which the moving image display device displays moving images by consecutively displaying a plurality of frame images, comprising:
inputting of moving images on which are recorded a plurality of frame images at a specified frame rate;
reading of the consecutively displayed first frame image and second frame image from the input moving images;
performing of the brightness reduction process for reducing the brightness for at least one of any of the first frame image and the second frame image;
generating of one or more intermediate frame images by synthesizing the first frame image and the second frame image after executing the brightness reduction process; and
displaying of intermediate frame after display of the first frame image and before display of the second frame image when displaying moving images by displaying the first and second frame images.

18. A computer program product for displaying moving images by a computer consecutively displaying a plurality of frame images,
consisting of a computer program and a recording medium on which this is recorded;
the computer program comprising:
a first program code for inputting moving images on which are recorded a plurality of frame images at a specified frame rate;
a second program code for reading the consecutively displayed first frame image and second frame image from the input moving image;
a third program code for performing the brightness reduction process for reducing the brightness on at least one of any of the first frame image or the second frame image;
a fourth program code for generating one or more intermediate frame images by synthesizing the first frame image and the second frame image after the brightness reduction process is executed; and
a fifth program code for displaying the intermediate frame image after display of the first frame image and before display of the second frame image when displaying a moving image by displaying the first and second frame image.

* * * * *